March 17, 1970 E. R. LIGON ET AL 3,500,680
METHOD AND APPARATUS FOR TESTING AND HANDLING CLAY PIPE
Filed Aug. 5, 1968 3 Sheets-Sheet 1

INVENTORS.
ELMER R. LIGON
NORMAN D. REED
BY
Fishburn, Gold & Litvan
ATTORNEYS

INVENTORS.
ELMER R. LIGON
NORMAN D. REED
ATTORNEYS

March 17, 1970 E. R. LIGON ET AL 3,500,680
METHOD AND APPARATUS FOR TESTING AND HANDLING CLAY PIPE
Filed Aug. 5, 1968 3 Sheets-Sheet 3
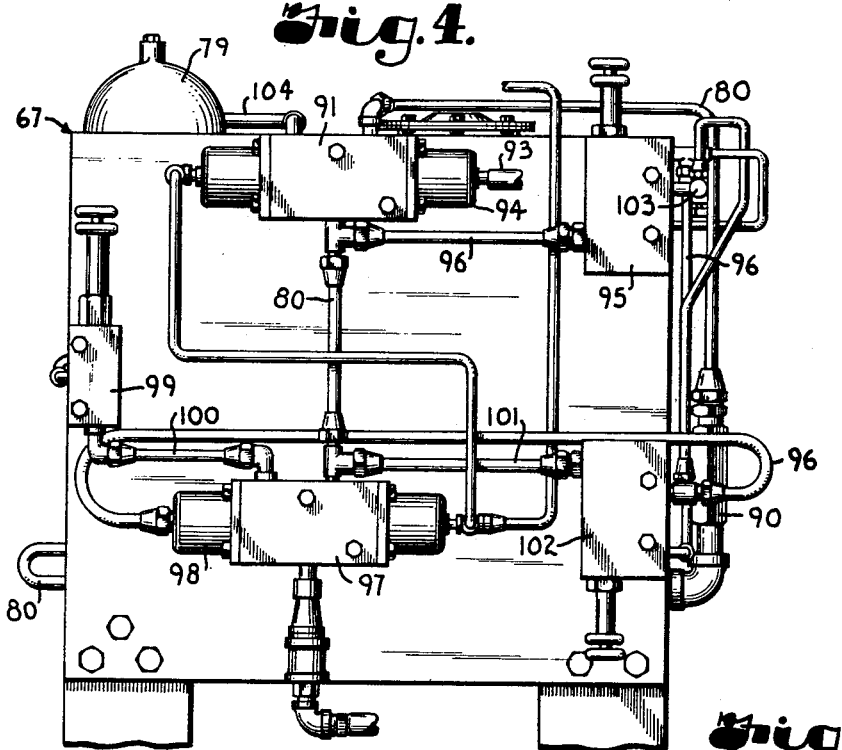
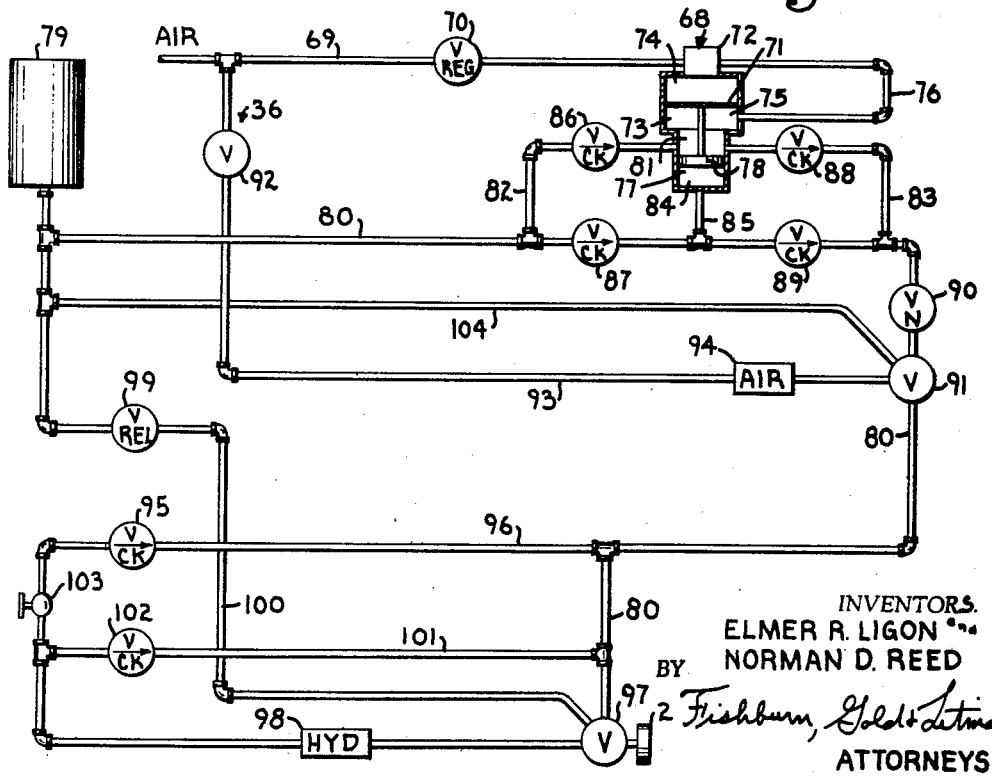
INVENTORS.
ELMER R. LIGON and
NORMAN D. REED
BY Fishburn, Gold & Litman
ATTORNEYS

United States Patent Office 3,500,680
Patented Mar. 17, 1970

3,500,680
METHOD AND APPARATUS FOR TESTING AND HANDLING CLAY PIPE
Elmer R. Ligon and Norman D. Reed, Pittsburg, Kans., assignors to W. S. Dickey Clay Manufacturing Company, Pittsburg, Kans., a corporation of Kansas
Filed Aug. 5, 1968, Ser. No. 750,173
Int. Cl. G01n 3/26
U.S. Cl. 73—102                                    13 Claims

ABSTRACT OF THE DISCLOSURE

Apparatus for testing pipe such as clay pipe for resistance to hoop and shear load. The apparatus includes an expandable member movable into a pipe portion and fluid pressure to expand said member under a predetermined pressure to apply an internal force on the pipe section. The apparatus preferably includes a pipe handling mechanism and carriage for moving the tested pipe. The mechanism includes a device for effecting opening of a normally closed three-way valve to permit hydraulic fluid under pressure to pass through a normally open three-way valve and to expand said expandable member in the tester to a selected hoop load on the pipe portion and activate a sequence and check valve at the selected hoop load which closes the normally open valve and completes a connection to a pressure relief valve to maintain the expandable member in a partially expanded condition with sufficient pressure to maintain gripping engagement between the tester and the pipe portion during moving of the pipe. Also a method of testing pipe and moving same wherein the pressure application engages the pipe to effect a gripping engagement and maintain the gripping engagement during moving the pipe.

---

This invention relates to a device for testing pipe portions particularly bells of clay pipe in hoop load and more particularly to a device having an expandable member adapted to produce the desired pressure and resulting hoop stress in a pipe bell. Also to such a device and method wherein the stress device grippingly engages the pipe bell and is used for moving of the pipe.

Pipe sockets are placed in a pipe line in a trench and are subjected to loading from two sources. The first source is the interference in the coupling which produces predominately tensile strains and the second source is differential movement in the ground which produces combined tensile, compressive, and shear strains. Non-metallic pipe materials, such as Portland cement concerete and ceramic materials are notoriously weak in tensile strength; therefore it is most probable that if the pipe sockets of ceramic material break, it will be from tensile strains irregardless of the type of loading to which the pipe is subjected.

Testing of pipe sockets by subjecting them to shear loads is used in the clay pipe industry, however, this method of testing is very slow and therefor is only used at infrequent intervals of pipe production. In the present invention, the test of pipe sockets is by expanding an internal bladder in pipe bells to produce tensile forces in the socket and thereby detect defective pipe.

The principal objects of the present invention are: to provide a method and apparatus for detecting defective and weak pipe which is fast, economical, and convenient; to provide such a method and apparatus for testing hoop and shear resistance in pipe during moving the pipe; to provide such apparatus for locating defective and weak pipe by employing a uniform test pressure on the pipe bell; to provide such apparatus adapted to apply uniform pressure on pipe bells which may be slightly out of round; to provide such apparatus which is simple to operate by a single operator and accurate in locating defecting and weak pipe; to provide such apparatus having fluid pressure operative to expand a pipe tester placed in a pipe to selected hoop load, maintain the tester in an expanded condition to grippingly engage the pipe, and relax the pipe tester to permit the tester to be removed from the pipe; and to provide such apparatus and method in pipe equipment for testing each pipe as it is moved from one position to another in a normal production process.

Other objects and advantages of this invention will become apparent from the following description taken in connection with the accompanying drawings wherein are set forth by way of illustration and example certain embodiments of this invention.

FIG. 4 is a rear elevational view of the piping and valve unit showing the valve side of the unit.

FIG. 6 is a schematic diagram of the piping and valves for the pipe testing and moving apparatus.

Figure 1:
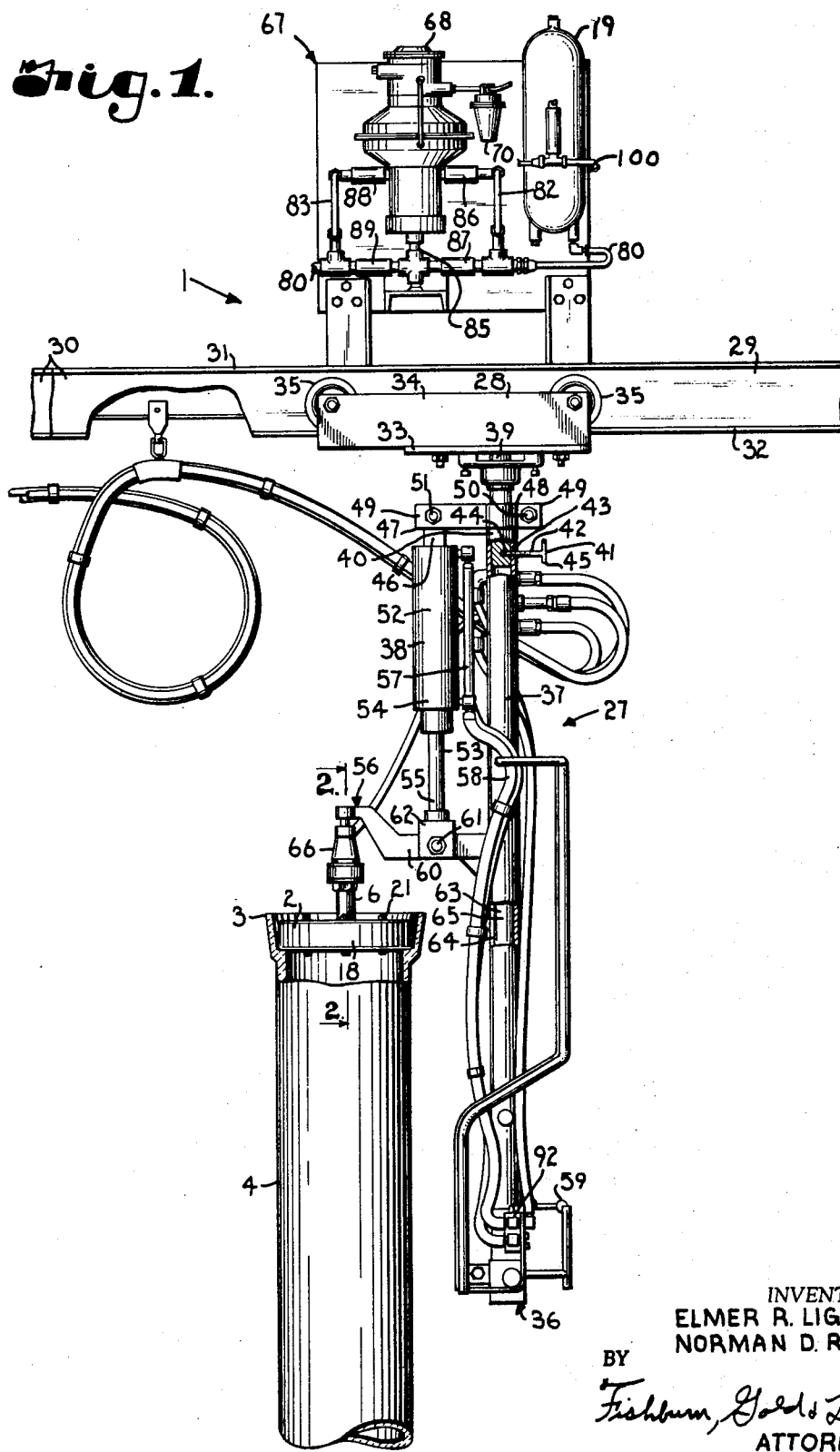
FIG. 1 is an elevational view of a pipe testing and moving apparatus embodying features of the present invention.
Figure 2:
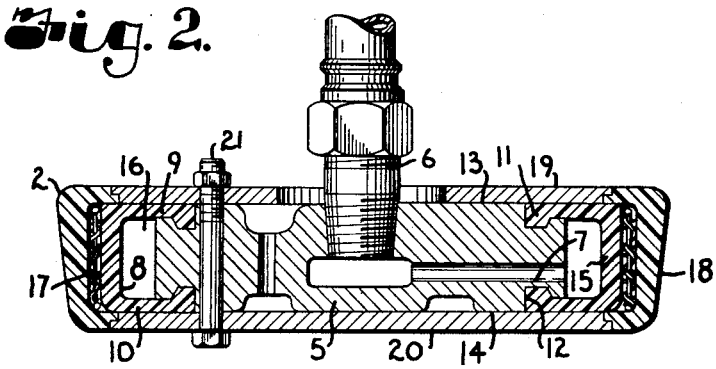
FIG. 2 is an enlarged transverse sectional view through the pipe tester taken on line 2—2, FIG. 1.
Figure 3:
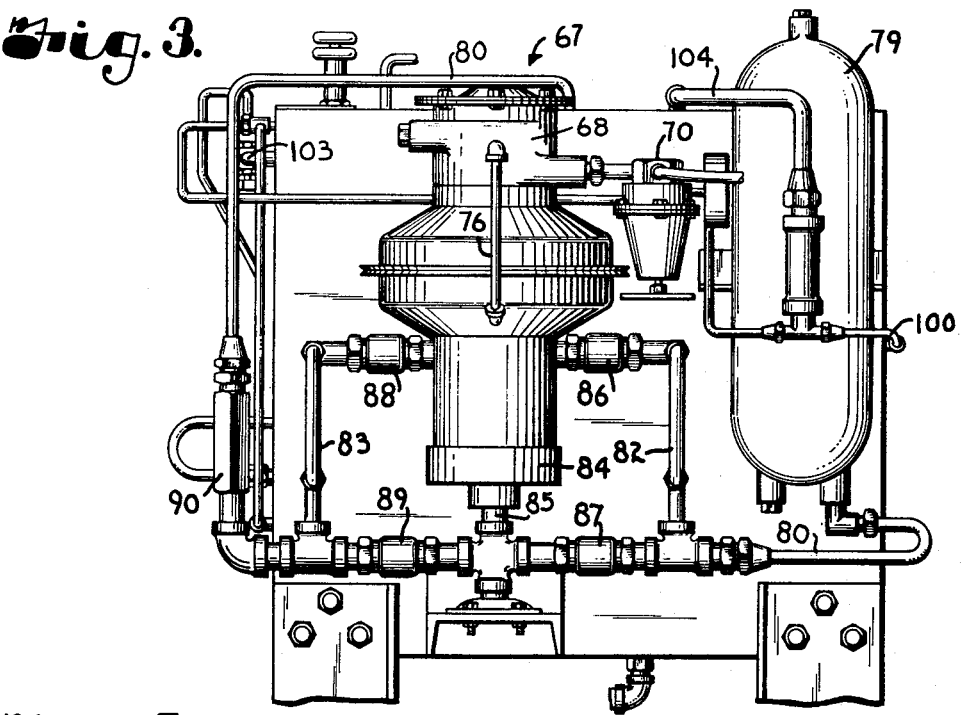
FIG. 3 is a front elevational view of a piping and valve unit showing the piping and booster side of the unit.
Figure 5:
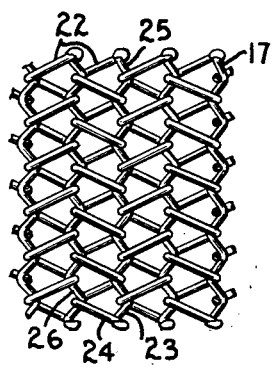
FIG. 5 is a fragmentary elevational view of a belt limiting expansion of the pipe tester.

Referring more in detail to the drawings:

The reference numeral 1 generally designates a pipe testing apparatus particularly adapted for testing pipe and hoop stress thereby locating defective and weak pipe. The apparatus 1 includes a pipe tester 2 which is movable into and out of a bell portion 3 of a pipe 4 to be tested. The pipe tester 2 is operatively connected to the source of fluid under pressure to expand the tester 2 while within the bell portion 3.

In the illustrated structure, the pipe tester 2 is expanded by hydraulic fluid and has an annular interior body portion 5 having a fluid supply pipe 6 communicating therewith for supply of fluid thereto and at least one passageway 7 extending inwardly from the periphery of the body portion 5 and communicating with the fluid supply pipe 6. Fluid under pressure is received in the body portion 5 and is movable through the passageway 7 to expand a resilient bladder 8 mounted on the periphery of the body portion 5. The bladder 8 is preferably formed of a suitable strong, resilient, and expandable material, such as rubber or synthetic resins as for example flexible polyurethane, and is illustrated as a U or channel shaped annular ring having upper and lower flanges 9 and 10 retained in position by the body portion 5. In the illustrated structure, ribs or projections 11 extend inwardly from each flange 9 and 10 and are received within recesses 12 in uppen and lower faces 13 and 14 respectively of the body portion 5. A web 15 of the bladder 8 joins the flanges 9 and 10 and is radially outwardly spaced from the periphery of the body portion 5 thereby forming a fluid chamber 16 for receiving fluid under pressure whereby the bladder 8 is expandable.

It is desirable to limit or control the outward expansion of the bladder 8 to prevent the rupture thereof. In the illustrated structure, an endless flexible expandable metal belt 17 engages a periphery of the bladder 8 and has a predetermined slack therein to permit the bladder 8 to expand radially outwardly to a desired limit. The belt 17 is encased by a tire 18 formed of a suitable resilient expandable material, such as rubber or synthetic resins for example a flexible polyurethane. The tire 18 has a periphery of a size to freely move in a pipe ball or portion to be tested and then be expanded to a substantially perfect fit within the contour thereof. It is also preferable to confine the expansion of the bladder 8 to radial directions and upper and lower bladder retaining plates 19 and 20 respectively engage the bladder flanges 9 and 10 and are suitably secured to the upper and lower faces 13 and 14 respectively of the body portion 5, as by a plurality of uniformly spaced bolts 21 extending therethrough.

The endless belt 17 is illustrated as including a plurality of interconnected metal links 22 each having an elongate rod 23 and a link rod 24 having opposite ends thereof suitably secured to respective opposite ends of the rod 23, as by welding. In the illustrated structure, the link rod 24 forms a plurality of elongate loops in a generally spiral path between said opposite ends of the rod 23. The elongate loops formed by the link rod 24 engage one edge 25 of the rod 23 to which it is secured and engage an opposite or other edge 26 of an adjacent elongate rod 23 of an adjacent link 22 thereby being interconnected with the adjacent link.

The endless belt 17, when fully expanded, has an internal diameter corresponding to the desired exterior limit of radial expansion of the periphery of the bladder 8. The desired slack is provided in the belt 17 by placing same in engagement with the periphery of the bladder 8 when in its relaxed condition and molding the tire 18 therearound. The rods 23 are each movable within the loops formed by the link rod 24 of an adjacent link 22. The one edge 25 of the rod 23 being movable toward the other or opposite edge 26 of the rod 23 of the adjacent link 22.

It is desirable to test the pipe 4 in connection with some other operation such as moving of fired pipe from a cooling and storage area to an area for further processing thereby consuming as little time as possible in locating and rejecting defective or weak pipe.

The pipe tester 2 is moved into the bell portion 3 of the pipe 4 and the bladder 8 and the tire 18 are hydraulically expanded therein by means of a predetermined fluid pressures, as later described. The fluid pressure is then automatically reduced to a pressure sufficient to maintain a gripping engagement between the tire 18 and the bell portion 3 which will support the entire weight of the pipe 14 during moving thereof.

In the illustrated structure, the pipe tester 2 is mounted on and operatively connected to a hoist 27 which is supported on a movable carriage 28. The hoist 27 and carriage 28 are movable along a crane 29 which is also movable along suitable end supports (not shown). The crane 29 includes spaced channel members 30 each having outwardly extending upper and lower flanges 31 and 32. The carriage 28 has a frame 33 and mounted thereon are a pair of elongate runners 34 laterally spaced apart and extending between opposite ends of the carriage 28. Rotatably mounted on opposite ends of each of the runners 34 are trolley wheels 35 having rims which are adapted to engage the lower flanges 32 of the respective channel members 30.

The pipe tester 2 is supported by the carriage 28 and is movable therewith and relative thereto. The movement of the pipe tester 2 relative to the carriage 28 and into and out of the pipe 4 is controlled by a control unit 36 which is preferably supported by the carriage 28. In the illustrated structure, the control unit 36 is mounted on an elongate support member 37 depending from the carriage 28 and the control unit 36 is operatively connected to the ball tester 2 and extensible member 38 having the tester 2 operatively connected thereto, as later described. In the illustrated structure, a shaft 39 is suitably secured to the carriage frame 33, as by welding, and depends therefrom. The support member 37 is illustrated as an elongate tubular member having an upper end 40 mounted on the shaft 39 and suitably retained thereon, as by a suitable fastener, such as an elongate bolt 41 having a bolt shaft 42 extending through a threaded bore 43 in the support member 37 and having one end of the bolt shaft 42 received in an annular recess 44 in the shaft 39. The bolt 41 includes a bolt head 45 for tightening the bolt 41 into firm engagement with the shaft 39 thereby positioning the support member 37 relative to the shaft 39.

An upper end 46 of the extensible member 38 is connected to and supported by a bracket 47 which is rotatably mounted on the shaft 39 above the support member 37. The bracket 47 engages the upper end 40 of the support member 37 and is thereby supported. The bracket 47 includes a split sleeve portion 48 adapted to engage the shaft 39 and two pair of diametrically opposed spaced bars 49 extending radially outwardly from the sleeve portion 48. The split sleeve portion 48 has the split between one pair of the bars 49 which may be suitably secured together, as by a bolt 50 extending through the one pair of bars 49 and which is adapted to tighten the split sleeve portion 48 into engagement with the shaft 39. The extensible member 38 has the upper end 46 suitably secured to the bracket 47, as by a bolt 51 extending through the other pair of bars 49. In the illustrated structure, the extensible member upper end 46 is a bar extending between the other pair spaced bars 49 and the bolt 51 secures the bar therebetween and may be tightened to provide clamping engagement between the other pair of spaced bars 49 and the bar of the upper end 46.

The extensible member 38 is a conventional member and consists of a cylinder 52 having a piston rod 53 connected thereto that extends through a lower end 54 of the cylinder 52 with the free end 55 of the piston rod 53 being operatively connected to a tester guide member 56, as later described. In the illustrated structure, withdrawing the piston rod 53 into the cylinder 52 moves the pipe tester 2 out of the bell end 3 and extending the piston rod 53 extends the pipe tester 2 into the bell end 3 of the pipe 4 being tested.

Suitable fluid, such as air, under pressure is applied to the upper and lower ends of the cylinder 52 through suitable flexible hoses or tubes 57 and 58 respectively under control of a lever 59 mounted on the control unit 36 with the lever 59 being operatively connected to a suitable control valve (not shown) whereby when fluid pressure is introduced through hose 57 into the upper end of the cylinder 52 in the piston rod 53 is extended downwardly and outwardly from the cylinder 52 to move the pipe tester 2 into the bell end 3 and when fluid pressure is introduced through hose 58 into the lower end of the cylinder 52, the piston rod 53 is withdrawn into the cylinder 52 thereby withdrawing the pipe tester 2 from the bell end 3 of the pipe 4 being tested.

In the illustrated structure, the tester guide member 56 includes an elongate bar 60 having the free end 55 of the piston rod 53 suitably secured thereto intermediate the ends thereof, as by a bolt 61 extending through a clip 62 mounted on the free end 55 and through the bar 60. A guide rod 63 is suitably secured to one end of the elongate bar 60, as by welding, and the guide rod 63 extends transversely thereof. The guide rod 63 is adapted to be received and movable within the tubular support member 37 with the elongate bar 60 being movable longitudinally in a guide slot 64 extending from a lower end 65 of the support member 37 to a point intermediate the ends thereof. The other end of the elongate bar 60 is adapted to support the pipe tester 2 by having a suitable pipe coupling 66 mounted therein which is adapted to be connected to the fluid supply pipe 6.

The fluid for expanding the bladder 8 is received through the fluid supply pipe 6 from a pressure booster and valve unit 67 which is operative to control the fluid pressure exerted on the bell portion or end 3 and in the illustrated structure, is positioned above and supported by the channel members 30. Air under pressure from a suitable source (not shown) communicates with a fluid pressure booster 68 through an air line 69. An air pressure regulator 70 is mounted in the air line 69 adjacent the pressure booster 68 and is adapted to maintain the air pressure supplied to the booster 68 within suitable limits, as for example a pressure in the nature of 40 to 50 pounds per square inch. The pressure booster 68 has a suitable diaphragm 71 responsive to air pressure. The air line 69 communicates with a suitable gate valve 72 in the booster 68 which is operatively connected to the diaphragm 71 to control movement thereof. The diaphragm 71 is in an air chamber 73 and divides same into an upper and lower chamber 74 and 75 respectively and a booster air line 76 communicates between the upper and lower air chambers 74 and 75 whereby the diaphragm 71 is automatically alternately expanded into the upper and lower chambers. The pressure booster 68 is operative to increase the pressure of a fluid, such as hydraulic fluid, in a fluid cylinder 77 of the pressure booster 68 in the nature of a four to one (4 to 1) ratio thereby increasing the hydraulic fluid pressure to a pressure in the nature of 160 to 200 pounds per square inch. The fluid cylinder 77 has a fluid piston 78 operatively connected to the diaphragm 71 and reciprocable within the fluid cylinder 77.

Fluid from a fluid reservoir 79 is supplied to the fluid cylinder 77 through a fluid flow line 80. The fluid enters an upper end 81 of the fluid cylinder 77 through an inlet line 82 which is connected to the flow line 80 and fluid exits from the upper end 81 through an outlet line 83 which extends from an opposite side of the upper end 81 to the fluid flow line 80. Fluid enters and exits from a lower end 84 of the fluid cylinder 77 through a combined inlet and outlet line 85 which extends between the lower end 84 of the cylinder 77 and the fluid flow line 80.

A suitable one way flow directional control valve, such as an upper inlet check valve 86, is positioned in the fluid inlet line 82 whereby the fluid may flow through the flow line 80 and the inlet line 82 to reach the upper end 81 of the fluid cylinder 77 and is prevented from flowing back into the flow line 80. A lower inlet check valve 87 is positioned in the flow line 80 between the connections of the inlet line 82 and the combined inlet and outlet line 85 thereto whereby fluid may flow to the lower end 84 of the fluid cylinder 77 and is prevented from flowing back through the line 80 back to the reservoir 79. An upper outlet check valve 88 is positioned in the fluid outlet line 83 to permit fluid to flow one way therethrough when the fluid piston 78 moves toward the upper end 81 of the fluid cylinder 77 and a lower outlet check valve 89 is placed in the fluid flow line 80 between the connections of the outlet 83 and the combined inlet and outline line 85 thereto whereby fluid flows through the combined inlet and outlet line 85 into the flow line 80 at an increased pressure when the fluid piston 78 moves toward the lower end 84 of the fluid cylinder 77. A suitable volume control valve, such as a needle valve 90 is positioned in the flow line 80 beyond the connection of the outlet line 83 to the flow line 80 to control surges of pressure from the cylinder 77 and prevent shock or impact loads on the bell end 3 of the pipe 4 being tested.

Fluid flow between the pressure booster 68 and the bell tester 2 is interrupted by a pneumatic operated three-way normally closed spring loaded valve 91. A manual three-way pneumatic valve 92 is operative to open the valve 91 to provide fluid flow to the pipe tester 2 and for convience of operation is mounted on the control unit 36 and is connected to the air line 69 and to the three-way normally closed valve 91 by an air line 93. Operation of the manually three-way valve 92 permits the air pressure to pass therethrough to open the three-way normally closed valve 91 by operating an air pressure responsive device 94 mounted in the air line 93 adjacent the valve 91 thereby permitting flow of fluid from the booster 68 to the pipe tester 2 and thereby expand the bladder 8 and tire 18.

It is desirable to hydraulically control the expansion of the pipe tester 2 within the bell end 3 by applying a pre-determined pressure thereto to detect and reject defective and weak pipe therefore, a sequence and check valve 95 is placed in a hydraulic line 96 having one end connected to the flow line 80 and the other end connected to a hydraulically activated three-way normally open spring loaded valve 97 in the flow line 80 adjacent the bell tester 2. The sequence and check valve 95 is adjusted to activate a hydraulic pressure responsive device 98 at a pressure sufficient to place the bell portion or end 3 under a selected hoop load. The selected pressure is sufficient to activate the pressure responsive device 98 to close the normally open three-way valve 97 and complete a hydraulic connection to a pressure relief valve 99 mounted in a relief line 100 which extends between the valve 97 and the fluid reservoir 79. The pressure relief valve 99 is adjusted to maintain a pressure sufficient to maintain a gripping engagement between the tire 18 and an interior surface of the bell end 3 whereby the pipe 4 may be moved through movement of the extensible member 38 and the control unit 36.

It is desirable to use the same tester 2 for testing extra strength pipe of the same size, therefore a fluid flow line 101 having one end connected to the fluid flow line 80 and the other end connected to the hydraulic line 96 has an adjustable sequence and check valve 102 installed therein, which is adjusted to a higher fluid pressure than the sequence and check valve 95. A suitable flow control valve, such as a stopcock 103, is placed in the hydraulic line 96 between the other end of the fluid flow line 101 and the sequence and check valve 95 thereby activating the pressure responsive device 98 at the increased pressure of the sequence and check valve 102.

It is necessary to completely relieve pressure on the bladder 8 of the tester 2 to remove same from the bell end 3 therefore a pressure relief line 104 extends between and is connected to the three-way normally closed valve 91 and the pressure relief line 100 whereby when the manual three-way valve 92 is operated, the three-way normally closed valve 91 will be closed by removing pressure on the pressure responsive device 94 thereby permitting the fluid pressure maintained by the pressure relief valve 99 to be dissipated through the bell tester 2 to the fluid reservoir 79.

In operation the control unit 36 is moved to align the pipe tester 2 with the bell end 3 of a pipe 4 to be tested. The lever 59 is operated to extend the piston rod 53 of the extensible member 38 to move the pipe tester 2 into the bell end 3. When in the bell end 3, the manual three-way air valve 92 is operated to open the normally closed three-way valve 91 and permit the bladder 8 to be expanded to the selected test pressure as determined by the sequence and check valve 95 and 102. When the selected pressure is reached in the bell tester 2, the operative sequence and check valve 95 or 102 closes the normally open three-way valve 97 thereby permitting fluid to communicate with the pressure relief valve 99 whereby the pressure in the bladder 8 is reduced to a pressure sufficient to maintain a gripping engagement with the bell end 3, which will support the entire weight of the pipe 4 when lifted and moved to a selected location, such as being placed on hangers (now shown) and moved to a loading area or to an area for further processing.

When it is desired to withdraw the bell tester 2 from the pipe 4, the manual three-way pneumatic valve 92 is again operated to permit the normally closed three-way valve 91 to move to its normally closed position thereby permitting the remaining pressure to pass therethrough to the fluid reservoir 79 while preventing fluid flow to the bladder 8.

It is to be understood that while we have illustrated and described one form of our invention, it is not to be limited to the specific form or arrangement of parts herein described and shown except insofar as such limitations are included in the claims.

What we claim and desire to secure by Letters Patent is:

1. Apparatus for testing pipe for resistance to hoop load comprising:
   (a) an annular expandable pipe testing member for engaging the interior surface of one end of a pipe being tested,
   (b) means for moving said testing member into and out of the end of said pipe,
   (c) means including fluid pressure means communicating with said expandable testing member for applying fluid pressure to expand said testing member to apply hoop load to said pipe end,
   (d) control means connected to said fluid pressure means for increasing and decreasing fluid pressure thereby respectively expanding and contracting said testing member whereby hoop load is applied to said pipe by expansion of said testing member therein and the testing member is relaxed to move same from the pipe,
   (e) said control means including valve means operative to permit fluid pressure to expand said testing member, and second valve means for reducing fluid pressure after expanding said testing member, said reduced pressure being operative to effect a gripping engagement between said testing member and the pipe being tested whereby movement of said testing member while maintaining said gripping engagement moves the pipe.

2. The apparatus for testing pipe as set forth in claim 1 wherein the means for moving said testing member into and out of said pipe end includes:
   (a) an extensible member having said pipe testing member mounted on one end thereof, and
   (b) a hoist having said extensible member mounted thereon.

3. The apparatus for testing pipe as set forth in claim 2 including:
   (a) a carriage having said hoist mounted thereon, and
   (b) a crane having said carriage mounted thereon for movement relative thereto.

4. Apparatus for testing pipe for resistance to hoop load comprising:
   (a) an annular expandable pipe testing member for engaging the interior surface of one end of a pipe being tested,
   (b) means for moving said testing member into and out of the end of said pipe,
   (c) means including fluid pressure means communicating with said expandable testing member for applying fluid pressure to expand said testing member to apply hoop load to said pipe end,
   (d) control means connected to said fluid pressure means for increasing and decreasing fluid pressure thereby respectively expanding and contracting said testing member whereby hoop load is applied to said pipe by expansion of said testing member therein and the testing member is relaxed to move same from the pipe,
   (e) a fluid flow line connected to said pipe testing member,
   (f) a source of fluid under pressure communicating with said fluid flow line,
   (g) a normally closed three-way valve in said fluid flow line between said pipe testing member and said source of fluid under pressure, and
   (h) a three-way control valve communicating with and operative to open and close said normally closed three-way valve.

5. The apparatus for testing pipe as set forth in claim 4 including:
   (a) a normally open three-way valve in said fluid flow line between said pipe testing member and said normally closed three-way valve, and
   (b) an adjustable sequence and check valve communicating with said fluid flow line and with said normally open three-way valve, said sequence and check valve being operative to close said normally open three-way valve at a selected pressure.

6. The apparatus for testing pipe as set forth in claim 5 including:
   (a) a second adjustable sequence and check valve connected in parallel with said first named sequence and check valve, said second sequence and check valve being adjusted to communicate with said normally open three-way valve at a pressure above the adjusted pressure of said first named sequence and check valve; and
   (b) valve means for selectively controlling fluid flow through said first named and said second sequence and check valve.

7. The apparatus for testing pipe as set forth in claim 5 including:
   (a) a fluid reservoir,
   (b) a second fluid flow line connecting said fluid reservoir and said normally open three-way valve,
   (c) a pressure relieve valve in said second fluid flow line effective to reduce pressure at said pipe testing member, said reduced pressure being effective to maintain a gripping engagement between said pipe tester and said pipe.

8. The apparatus for testing pipe as set forth in claim 7 including:
   (a) an air flow line having said three-way control valve therein;
   (b) a source of air under pressure communicating with said air flow line;
   (c) a pressure booster connected to said source of air under pressure and to said first named fluid flow line, said pressure booster being operative to increase fluid pressure in said first named fluid flow line; and
   (d) a flow control valve in said first named fluid flow line between said booster and said normally closed three-way valve for controlling fluid pressure delivery to said normally closed three-way valve when same is open.

9. The apparatus for testing pipe as set forth in claim 4 wherein said pipe testing member includes:
   (a) an annular body portion connected to said fluid flow line,
   (b) an expandable bladder engaging said body portion and having a portion thereof spaced radially outwardly from a periphery of said body portion,
   (c) means engaging said bladder for limiting expansion of said bladder, and
   (d) a resilient expandable tire surrounding said bladder whereby said fluid expands said bladder and tire into engagement with said pipe end.

10. The apparatus for testing pipe as set forth in claim 9 wherein:
    (a) said means for limiting expansion of said bladder is a flexible belt engaging a periphery of said bladder, and
    (b) said belt is surrounded by said resilient tire.

11. The apparatus for testing pipe as set forth in claim 10 wherein said flexible belt is an endless metal member including:
    (a) a plurality of interconnected metal links, said links each having a link rod forming a plurality of loops and having opposite ends thereof secured to opposite ends of an elongate rod.

12. A method of testing and moving pipe comprising the steps of:
    (a) inserting a pipe tester into an end of a pipe to be tested,
    (b) applying a selected uniform hoop load to the pipe by expanding the pipe tester into engagement with the pipe end, (c) maintaining the uniform hoop load on the pipe end for a selected time period whereby defective pipe will fail, (d) thereafter maintaining a gripping engagement between the tester and the pipe, (e) moving the tester while maintaining the gripping engagement, and (f) relaxing the tester and removing same from the pipe end.

13. The method of testing and moving pipe as set forth in claim 12 including the steps of:

(a) supplying fluid under pressure to the pipe tester;

(b) increasing the fluid pressure to a selected test pressure to expand the pipe tester;

(c) maintaining the increased fluid pressure for a selected time period;

(d) reducing the fluid pressure at the tester to a selected pressure below the test pressure, the reduced pressure being effective to maintain said gripping engagement; and (e) maintaining the reduced pressure while moving the pipe.

References Cited

UNITED STATES PATENTS

| | | | |
|---|---|---|---|
| 2,416,441 | 2/1947 | Grant et al. | 73—49.5 X |
| 2,821,851 | 2/1958 | Daley | 73—37 |
| 2,950,620 | 8/1960 | Magill | 73—102 X |

JERRY W. MYRACLE, Primary Examiner

U.S. Cl. X.R.

73—49.5